(12) United States Patent
Botts

(10) Patent No.: US 11,035,514 B1
(45) Date of Patent: *Jun. 15, 2021

(54) UNDERGROUND PIPE REPAIR DEVICE WITH ANNULAR SPACER AND RELATED SYSTEMS AND METHODS

(71) Applicant: Improved Infrastructure Solutions, LLC, Winter Park, FL (US)

(72) Inventor: Jerold L Botts, Orlando, FL (US)

(73) Assignee: Improved Infrastructure Solutions, LLC, Winter Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,266

(22) Filed: Nov. 20, 2019

Related U.S. Application Data

(63) Continuation of application No. 16/164,008, filed on Oct. 18, 2018, now Pat. No. 10,514,125, which is a continuation-in-part of application No. 15/943,837, filed on Apr. 3, 2018, now Pat. No. 10,309,575, which is a continuation-in-part of application No. 15/485,444, filed on Apr. 12, 2017, now Pat. No. 9,933,105.

(51) Int. Cl.
| | | |
|---|---|---|
| *F16L 55/162* | (2006.01) | |
| *F16L 55/18* | (2006.01) | |
| *F16L 55/165* | (2006.01) | |
| *F16L 55/179* | (2006.01) | |

(52) U.S. Cl.
CPC .............. *F16L 55/18* (2013.01); *F16L 55/165* (2013.01); *F16L 55/179* (2013.01)

(58) Field of Classification Search
CPC ....... F16L 55/165; F16L 55/179; F16L 55/18; F16L 55/162; F16L 55/163
USPC ........................................................ 405/184.2
See application file for complete search history.

(56) References Cited

U.S. PATENT DOCUMENTS

| | | | |
|---|---|---|---|
| 5,197,540 A * | 3/1993 | Yagi ...................... | F16L 55/179 166/55.8 |
| 5,329,063 A | 7/1994 | Endoh | |
| 5,439,033 A | 8/1995 | Kamiyama et al. | |
| 5,454,401 A | 10/1995 | Kamiyama et al. | |
| 5,566,719 A | 10/1996 | Kamiyama et al. | |
| 5,598,873 A | 2/1997 | Kamiyama et al. | |
| 5,609,439 A * | 3/1997 | Schreiner .............. | F16L 55/265 405/184.2 |
| 5,916,406 A | 6/1999 | Kamiyama et al. | |
| 5,944,058 A | 8/1999 | Kamiyama et al. | |

(Continued)

FOREIGN PATENT DOCUMENTS

CA 3004341 A1 * 5/2017 ............ F16L 55/165

*Primary Examiner* — Frederick L Lagman
(74) *Attorney, Agent, or Firm* — Allen, Dyer, Doppelt + Gilchrist, PA

(57) ABSTRACT

An underground pipe repair device is for a joint between a service pipe and a branch pipe. The underground pipe repair device may include a first T-shaped joint liner having a base portion extending laterally in the service pipe, and an arm portion extending vertically into the branch pipe. The underground pipe repair device may also include an annular body aligned with and being radially spaced from an opening for the branch pipe and coupled to the first T-shaped joint liner for enabling reinstatement of the branch pipe opening without damaging a liner in the service pipe or the first T-shaped joint liner.

20 Claims, 5 Drawing Sheets

(56) References Cited

U.S. PATENT DOCUMENTS

| | | |
|---|---|---|
| 5,971,031 A | 10/1999 | Kamiyama et al. |
| 6,006,787 A | 12/1999 | Kamiyama et al. |
| 6,085,794 A | 7/2000 | Kamiyama et al. |
| 6,103,052 A | 8/2000 | Kamiyama et al. |
| 6,123,109 A | 9/2000 | Kamiyama et al. |
| 6,152,184 A | 11/2000 | Kamiyama et al. |
| 6,158,473 A | 12/2000 | Kamiyama et al. |
| 6,994,118 B2 | 2/2006 | Kiest, Jr. et al. |
| 7,028,716 B2 | 4/2006 | Kaneta et al. |
| 7,121,305 B2 | 10/2006 | Kaneta et al. |
| 7,398,797 B2 | 7/2008 | Kamiyama et al. |
| 7,987,873 B2 | 8/2011 | Kiest, Jr. |
| 8,636,036 B2 | 1/2014 | Kiest, Jr. |
| 8,667,992 B2 | 3/2014 | Kiest, Jr. |
| 8,689,835 B2 | 4/2014 | Kiest, Jr. |
| 8,807,873 B2 | 8/2014 | Kiest, Jr. |
| 8,844,577 B2 | 9/2014 | Kiest, Jr. |
| 9,261,221 B2 | 2/2016 | Kiest, Jr. |
| 9,481,974 B2 | 11/2016 | Kiest, Jr. |
| 9,499,955 B2 | 11/2016 | Kiest, Jr. et al. |
| 9,933,105 B1 | 4/2018 | Botts |
| 10,065,359 B2 | 9/2018 | Kiest, Jr. |
| 10,309,575 B2 * | 6/2019 | Botts ................ F16L 55/165 |
| 10,514,125 B1 * | 12/2019 | Botts ................ F16L 55/165 |
| 2006/0005893 A1 | 1/2006 | Kaneta et al. |
| 2006/0219311 A1 * | 10/2006 | Kiest, Jr. .............. G09F 3/0295 |
| | | 138/98 |
| 2008/0029177 A1 | 2/2008 | Kamiyama et al. |
| 2008/0245433 A1 | 10/2008 | Warren |
| 2009/0056823 A1 | 3/2009 | Kiest, Jr. |
| 2010/0187813 A1 * | 7/2010 | Anders ................ F16L 55/265 |
| | | 285/204 |
| 2011/0203719 A1 | 8/2011 | Kiest, Jr. |
| 2012/0084956 A1 * | 4/2012 | Kiest, Jr. .............. B23P 11/022 |
| | | 29/402.09 |
| 2012/0261015 A1 | 10/2012 | Warren |
| 2013/0213513 A1 | 8/2013 | Kiest, Jr. |
| 2013/0249208 A1 | 9/2013 | Kiest, Jr. |
| 2015/0267375 A1 | 9/2015 | Kiest, Jr. |
| 2016/0010781 A1 | 1/2016 | Kiest, Jr. et al. |
| 2016/0223121 A1 | 8/2016 | Kiest, Jr. |
| 2016/0223122 A1 | 8/2016 | Kiest, Jr. |
| 2016/0348827 A1 | 12/2016 | Kiest, Jr. et al. |
| 2016/0348828 A1 | 12/2016 | Mathey et al. |
| 2017/0146178 A1 | 5/2017 | Kiest, Jr. |
| 2019/0277437 A1 * | 9/2019 | Kiest, Jr. ............ F16L 55/1654 |

* cited by examiner

UNDERGROUND PIPE REPAIR DEVICE WITH ANNULAR SPACER AND RELATED SYSTEMS AND METHODS

RELATED APPLICATION

This application is a continuation of prior filed copending application Ser. No. 16/164,008 filed Oct. 18, 2018, now U.S. Pat. No. 10,514,125, which is a continuation-in-part of prior filed copending application Ser. No. 15/943,837 filed Apr. 3, 2018, now U.S. Pat. No. 10,309,575, which is a continuation-in-part of prior filed copending application Ser. No. 15/485,444 filed Apr. 12, 2017, now U.S. Pat. No. 9,933,105, the entire subject matter of these applications is incorporated herein by reference in its entirety. The present application includes only the disclosure of parent application Ser. No. 15/485,444, now U.S. Pat. No. 9,933,105, and is therefore entitled to an effecting filing date of Apr. 12, 2017.

TECHNICAL FIELD

The present disclosure relates to the field of underground pipe repair, and, more particularly, to underground sewer pipe repair devices and related methods.

BACKGROUND

Pervasive gravity based sewer systems have been the hallmark of advanced human civilization since the Roman Empire. In most modern metropolitan applications, the service sewer pipe (i.e. the "main") runs along a street, and adjacent properties each connect to the service sewer pipe via a respective branch sewer pipe. Over time, subterranean pressure and moisture cause deterioration in a joint between each branch sewer pipe and the service sewer pipe. One approach is to excavate and replace each of the branch and service sewer pipes. Of course, although functionally ideal, the approach is very expensive and disruptive to property owners.

Another approach to this issue is excavationless/trenchless repair of the branch and service sewer pipes via a relining process. In particular, the approach includes relining the joint between each branch sewer pipe and the service sewer pipe. In typical approaches to fixing a leak in the sewer connection, a new liner is applied to the service sewer pipe. The branch sewer pipe also receives a new liner. The prior art process includes applying a specially shaped liner for the joint, for example, a vertically inverted T-shaped liner that extends upward into the branch sewer pipe. The typical approach includes subsequently applying a new liner for the service sewer pipe. The problem with this approach is that the joint portion of the liner may be damaged during the application of the liner for service sewer pipe, in particular, the steps of curing the liner for the service sewer pipe and cutting an opening in that new liner of the service sewer pipe at the joint.

SUMMARY

Generally, an underground pipe repair device is for a joint between a service pipe and a branch pipe. The underground pipe repair device may include a first T-shaped joint liner having a base portion extending laterally in the service pipe, and an arm portion extending vertically into the branch pipe. The underground pipe repair device may also include an annular spacer aligned with and being radially spaced from an opening for the branch pipe. The annular spacer defines an annular gap between the annular spacer and the opening for the branch pipe. The annular spacer is coupled to the first T-shaped joint liner for enabling reinstatement of the branch pipe opening without damaging a liner in the service pipe or the first T-shaped joint liner.

More specifically, the annular spacer may extend vertically into the service pipe to provide a radial bump about the opening of the branch pipe. The annular spacer may define a plurality of radial gaps. The annular spacer may comprise portions, each portion having a different color. The annular spacer may comprise a plastic material. The annular spacer may comprise a frangible material. The annular spacer may have rectangle-shaped cross section. For example, the annular spacer may be ellipse-shaped, or circle-shaped.

Another aspect is directed to an underground pipe repair system for a joint between a service pipe and a branch pipe. The underground pipe repair system may include an underground pipe repair device comprising a first T-shaped joint liner having a base portion extending laterally in the service pipe, and an arm portion extending vertically into the branch pipe. The underground pipe repair device may comprise an annular spacer aligned with and being radially spaced from an opening for the branch pipe. The annular spacer defines an annular gap between the annular spacer and the opening for the branch pipe. The annular spacer is coupled to the first T-shaped joint liner for enabling reinstatement of the branch pipe opening without damaging a liner in the service pipe or the first T-shaped joint liner. The annular spacer may extend vertically into the service pipe to provide a radial bump about the opening of the branch pipe. The underground pipe repair system may comprise a robot device comprising a transceiver, a cutting tool, and a processor coupled to the transceiver and the cutting tool and configured to move through the service pipe and determine a position of the radial bump, and operate the cutting tool to cut an opening in the liner of the service pipe aligned with the annular spacer so that a portion the liner of the service pipe adjacent the opening of the branch pipe is removed.

Yet another aspect is directed to a method for operating an underground pipe repair system for repairing a joint between a service pipe and a branch pipe. The method may comprise positioning an underground pipe repair device at the joint. The underground pipe repair device may include a first T-shaped joint liner having a base portion extending laterally in the service pipe, and an arm portion extending vertically into the branch pipe, and an annular spacer aligned with and being radially spaced from an opening for the branch pipe. The annular spacer defines an annular gap between the annular spacer and the opening for the branch pipe. The annular spacer is coupled to the first T-shaped joint liner for enabling reinstatement of the branch pipe opening without damaging a liner in the service pipe or the first T-shaped joint liner. The method may include curing the underground pipe repair device to the joint, applying and curing a liner for the service pipe, and cutting an opening in the liner of the service pipe aligned with the annular spacer so that a portion the liner of the service pipe adjacent the opening of the branch pipe is removed.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

Figure 1:
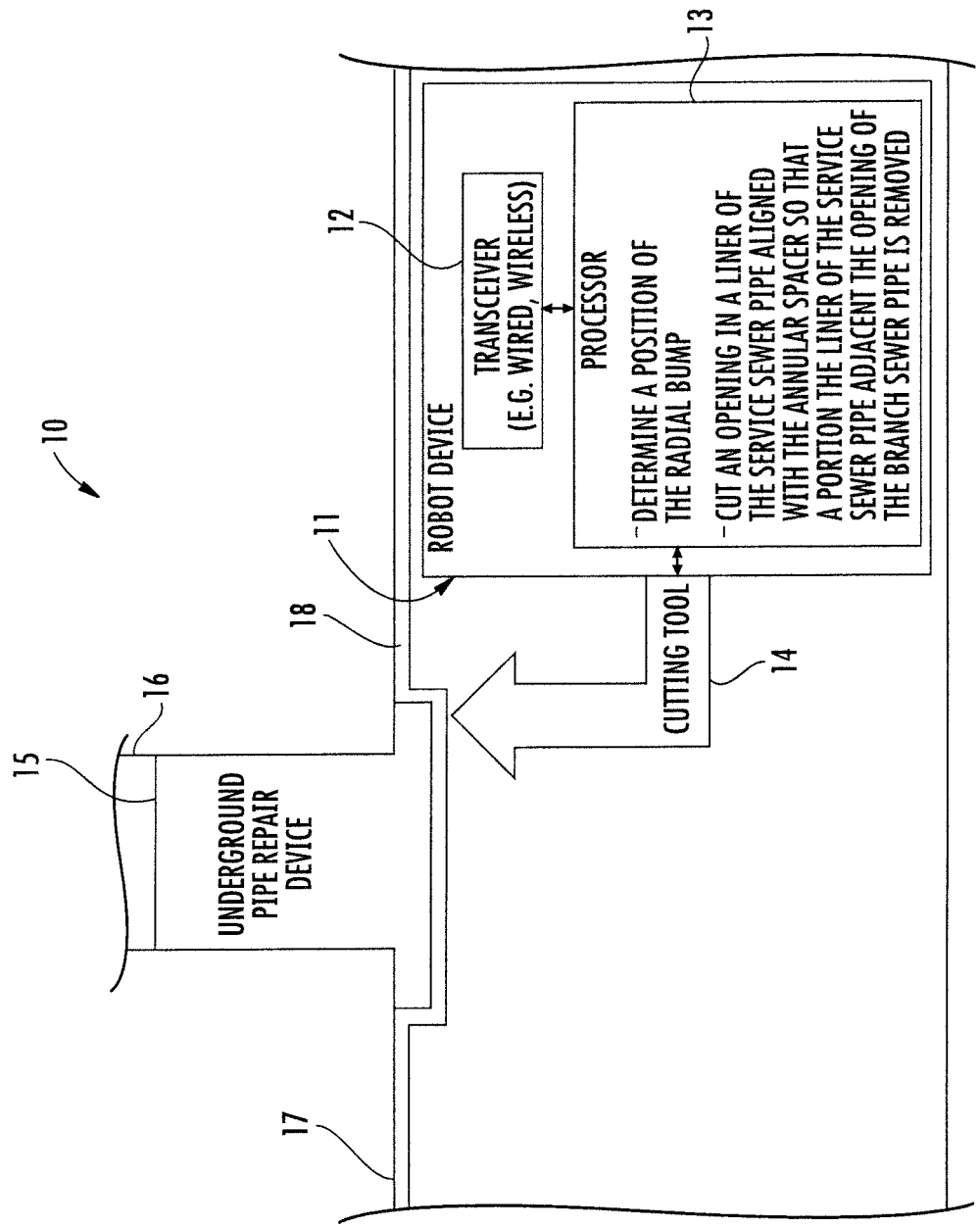
FIG. 1 is a schematic diagram of an underground pipe repair system, according to the present disclosure.

Referring initially to FIG. 1, an underground pipe repair system 10 for a joint between a service sewer pipe 17 and a branch sewer pipe 16. The underground pipe repair system 10 illustratively includes an underground pipe repair device 15, and a robot device 11 comprising a transceiver (e.g. wired or wireless) 12, a cutting tool 14, and a processor 13 coupled to the transceiver and the cutting tool. Although not shown, the underground pipe repair system 10 may include a surface controller configured to control operation of the robot device 11 via the transceiver 12.

The robot device 11 may include a video sensor, for example, a high definition video camera with environmental protection (e.g. water and dust proofing). The processor 13 is coupled to the video sensor, cooperates with the transceiver 12, and is configured to transmit video data from the video sensor to the controller. In some embodiments, the robot device 11 may include a battery power source coupled to the processor 13, the transceiver 12, and the cutting tool 14. In other embodiments, the robot device 11 may include a wired powered source at the surface.

The underground pipe repair device 15 illustratively includes a first T-shaped joint liner 19 having a base portion 21 extending laterally in the service sewer pipe 17, and an arm portion 20 extending vertically into the branch sewer pipe 16. In some embodiments, the base portion 21 and the arm portion 20 are integral and monolithic, but in other embodiments, the base portion 21 and the arm portion 20 may be modular and coupled together via stitching, for example.

The underground pipe repair device 15 illustratively includes a second ring-shaped liner 22 under the first T-shaped joint liner 19 and aligned with an opening in the branch sewer pipe 16. The second ring-shaped liner 22 includes a medial opening positioned over the opening in the branch sewer pipe 16.

The underground pipe repair device 15 illustratively includes an annular spacer 25 aligned with the opening in the branch sewer pipe 16 and being between the first T-shaped joint liner 19 and the second ring-shaped liner 22. The annular spacer 25 includes a radial step 26. In other embodiments, the annular spacer 25 may comprise a plurality of radial steps.

The second ring-shaped liner 22 is coupled to the base portion 21 of the first T-shaped joint liner 19 to retain the annular spacer 25. The annular spacer 25 extends vertically into the service sewer pipe 17 so that the second ring-shaped liner 22 has a radial bump 23 about the opening of the branch sewer pipe 16.

The first T-shaped joint liner 19 and the second ring-shaped liner 22 each comprises a flexible curable material. The flexible curable material may be curable via ultraviolet radiation, infrared radiation (i.e. thermal energy), a chemical immersion, or water, for example.

The processor 13 is configured to cause the robot device 11 to move through the service sewer pipe 17 and determine a position of the radial bump 23, and operate the cutting tool 14 to cut an opening in a liner 18 of the service sewer pipe aligned with the annular spacer 25 so that a portion of the liner of the service sewer pipe adjacent the opening of the branch sewer pipe 16 is removed.

In the illustrated embodiment, the underground pipe repair device 15 includes a ring-shaped release tab 28 coupled to the second ring-shaped liner 22 and configured to prevent the liner 18 for the service sewer pipe 17 from bonding to adjacent portions of the second ring-shaped liner. The ring-shaped release tab 28 may be coupled to the second ring-shaped liner 22 via an adhesive layer (not shown) interposed between the ring-shaped release tab and the second ring-shaped liner. In other embodiments, the ring-shaped release tab 28 may be coupled to the second ring-shaped liner 22 via mechanical interface, such as buttons, rivets, for example.

During repair of the joint, the liner 18 for the service sewer pipe 17 is installed and cured after the installation and curing of the first T-shaped joint liner 19. The ring-shaped release tab 28 provides a barrier between adjacent portions of the liner 18 for the service sewer pipe 17 and the first T-shaped joint liner 19. In typical approaches, the curing of the liner 18 for the service sewer pipe 17 may damage the adjacent portions of the first T-shaped joint liner 19, but in the disclosed approach, the ring-shaped release tab 28 provides protection from the second curing process. In fact, once the robot device 11 performs the cutting operation, the portion of the liner 18 of the service sewer pipe 17 adjacent the opening of the branch sewer pipe 16 is released.

In some embodiments (FIG. 5), the annular spacer 25 defines a plurality of radial gaps. During installation of the underground pipe repair device 15 at the joint, the annular spacer 25 is configured to flex to fit the opening in the branch sewer pipe 16. For example, the annular spacer 25 may be ellipse-shaped, or circle-shaped. The annular spacer 25 can be filled with a sealant to act as a gasket, further enhancing a seal between the service pipe liner and the first T-shaped joint liner 19.

The radial step 26 of the annular spacer 25 defines a pair of radial portions 27a-27b. Each radial portion 27a-27b of the annular spacer 25 has a different readily identifiable color (e.g. a bright primary color). Also, the annular spacer 25 may comprise a plastic material, and/or a frangible material (i.e. permitting the cutting tool 14 to readily remove portions of the annular spacer). Advantageously, the user operating the robot device 11 may precisely control the cutting step via the color indicators. This is in contrast to typical approaches where the user could inadvertently puncture the replacement liner.

Moreover, the stepped shape of the annular spacer enables the robot device 11 to be equipped with a lateral cutting tool, i.e. the cutting blade is parallel to the service sewer pipe 17. This horizontal cutting blade also prevents damage to the replacement liner since a vertical blade is not used.

In the illustrated embodiment, the joint is between the service sewer pipe 17 and the branch sewer pipe 16. In other embodiments, the underground pipe repair system 10 can be used on other underground pipe systems (e.g. storm water, drainage) where trenchless repair is desirable.

Figure 4:
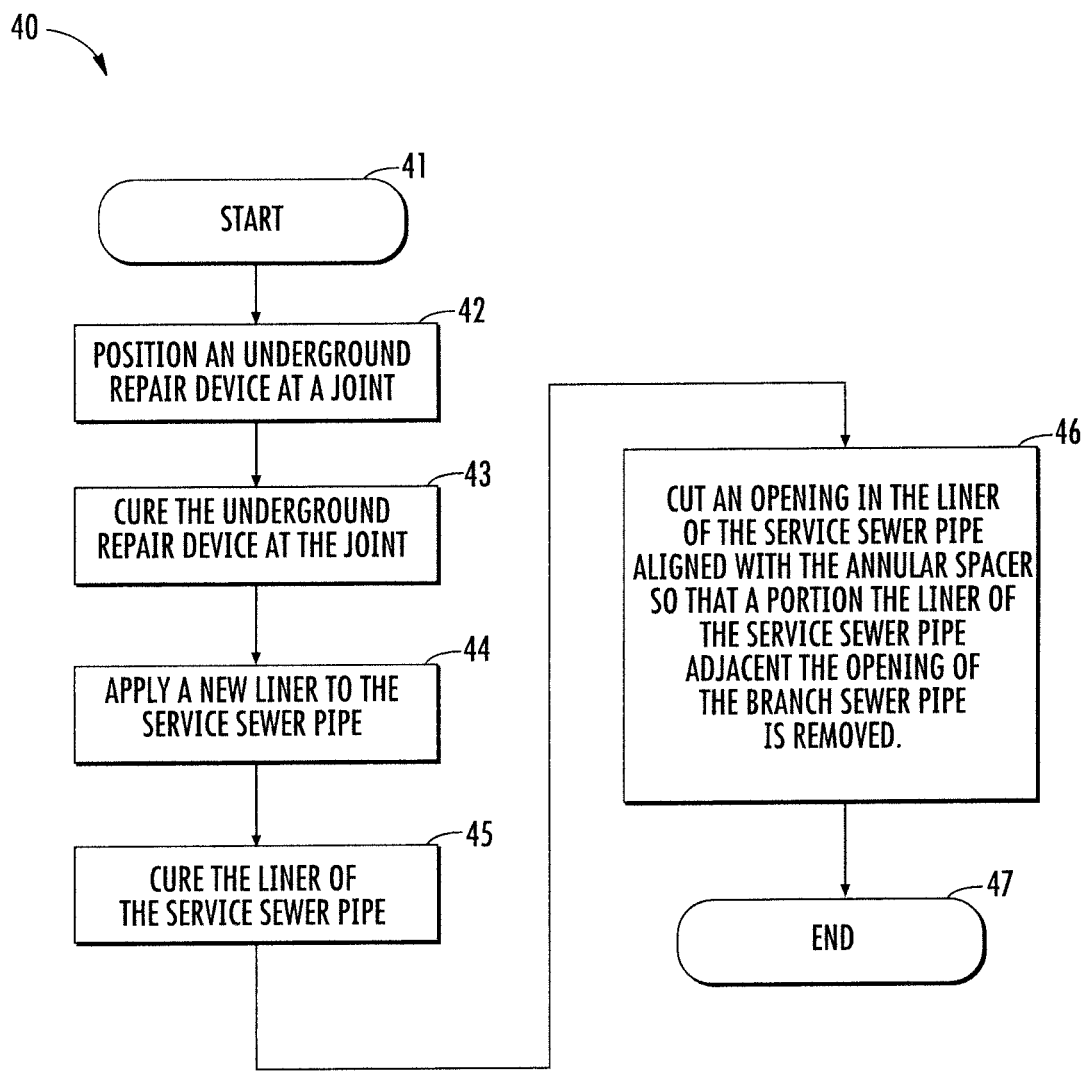
FIG. 4 is a flowchart illustrating a method for operating the underground pipe repair system of FIG. 1.

Referring now additionally to FIG. 4 and to a flowchart 20 therein, another aspect is directed to a method for operating an underground pipe repair system 10 for repairing a joint between a service sewer pipe 17 and a branch sewer pipe 16. The method comprises positioning an underground pipe repair device 15 at the joint. (Blocks 41-42). The underground pipe repair device 15 comprises a first T-shaped joint liner 19 having a base portion 21 extending laterally in the service sewer pipe 17, and an arm portion 20 extending vertically into the branch sewer pipe 16, and a second ring-shaped liner 22 under the first T-shaped joint liner and aligned with an opening in the branch sewer pipe.

The underground pipe repair device 15 comprises an annular spacer 25 aligned with the opening in the branch sewer pipe 16 and being between the first T-shaped joint liner 19 and the second ring-shaped liner 22. The annular spacer 25 includes at least one radial step 26, and the second ring-shaped liner 22 is coupled to the base portion 21 of the first T-shaped joint liner 19 to retain the annular spacer. The annular spacer 25 extends vertically into the service sewer pipe 17 so that the second ring-shaped liner 22 has a radial bump 23 about the opening of the branch sewer pipe 16.

The method also includes curing the underground pipe repair device 15 to the joint (Block 43), applying and curing a liner 18 for the service sewer pipe 17 (Blocks 44-45), and cutting an opening in the liner of the service sewer pipe aligned with the annular spacer 25 so that a portion the liner of the service sewer pipe adjacent the opening of the branch sewer pipe 16 is removed. (Blocks 46-47).

Figure 2:
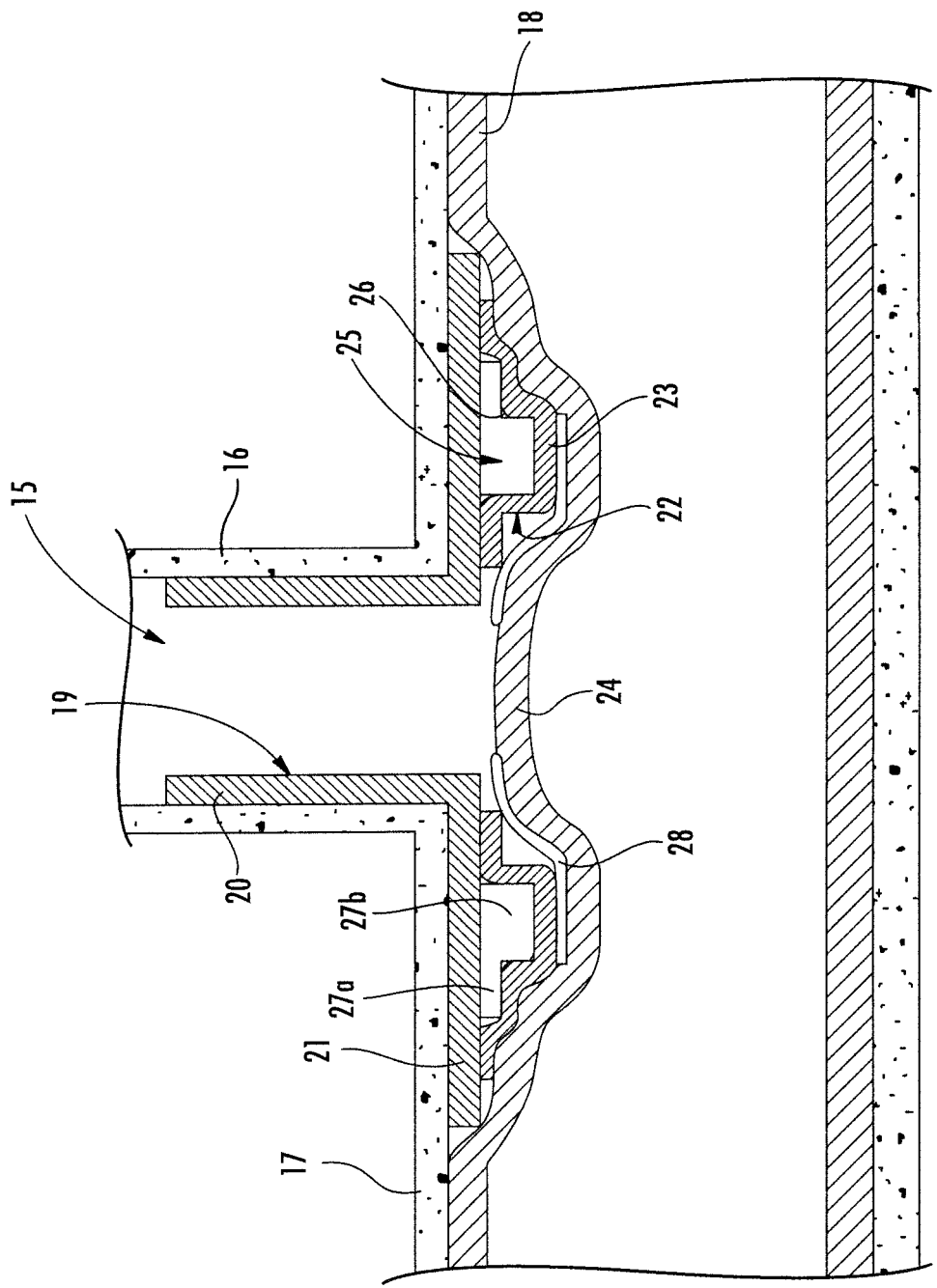
FIG. 2 is a schematic diagram of an underground pipe repair device, according to a first example embodiment.

In some embodiments (FIG. 2), the underground pipe repair device 15 may comprise a ring-shaped release tab 28 coupled to the second ring-shaped liner 22, and the method may further comprise preventing the liner 18 for the service sewer pipe 17 from bonding to adjacent portions of the second ring-shaped liner. In other embodiments (FIG. 3), the underground pipe repair device 15 may include a coating layer 28' on the second ring-shaped liner 22, and the method may further comprise preventing the liner 18 for the service sewer pipe 17 from bonding to adjacent portions of the second ring-shaped liner.

Also, the annular spacer 25 may define a plurality of radial gaps, and the method may further comprise flexing a shape of the annular spacer to fit the opening in the branch sewer pipe 16. The at least one radial step 26 of the annular spacer 25 may define at least one pair of radial portions 27a-27b, and each radial portion of the annular spacer may have a different color. The method may also comprise controlling the cutting based upon visibility of the different color of each radial portion 27a-27b.

Figure 3:
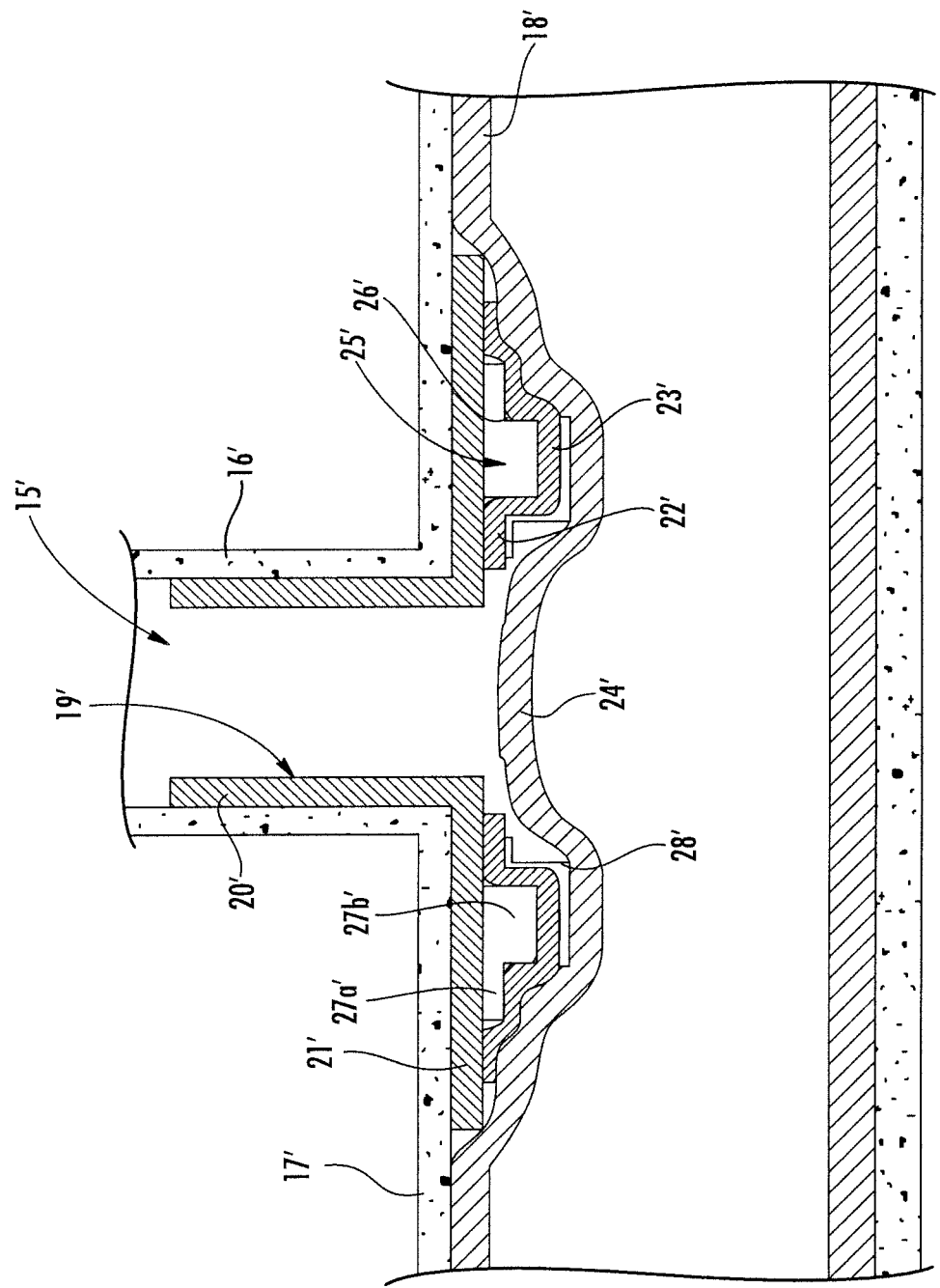
FIG. 3 is a schematic diagram of an underground pipe repair device, according to a second example embodiment.

Referring now additionally to FIG. 3, another embodiment of the underground pipe repair device 15' is now described. In this embodiment of the underground pipe repair device 15', those elements already discussed above with respect to FIGS. 1-2 are given prime notation and most require no further discussion herein. This embodiment differs from the previous embodiment in that this underground pipe repair device 15' has a coating layer 28' on the second ring-shaped liner 22' and configured to prevent the liner 18' for the service sewer pipe 17' from bonding to adjacent portions of the second ring-shaped liner. The coating layer 28' may comprise a material that has chemically resistant characteristics to the curing process of the liner 18' for the service sewer pipe 17'. The material may comprise polytetrafluoroethylene (PTFE), for example.

Figure 5:
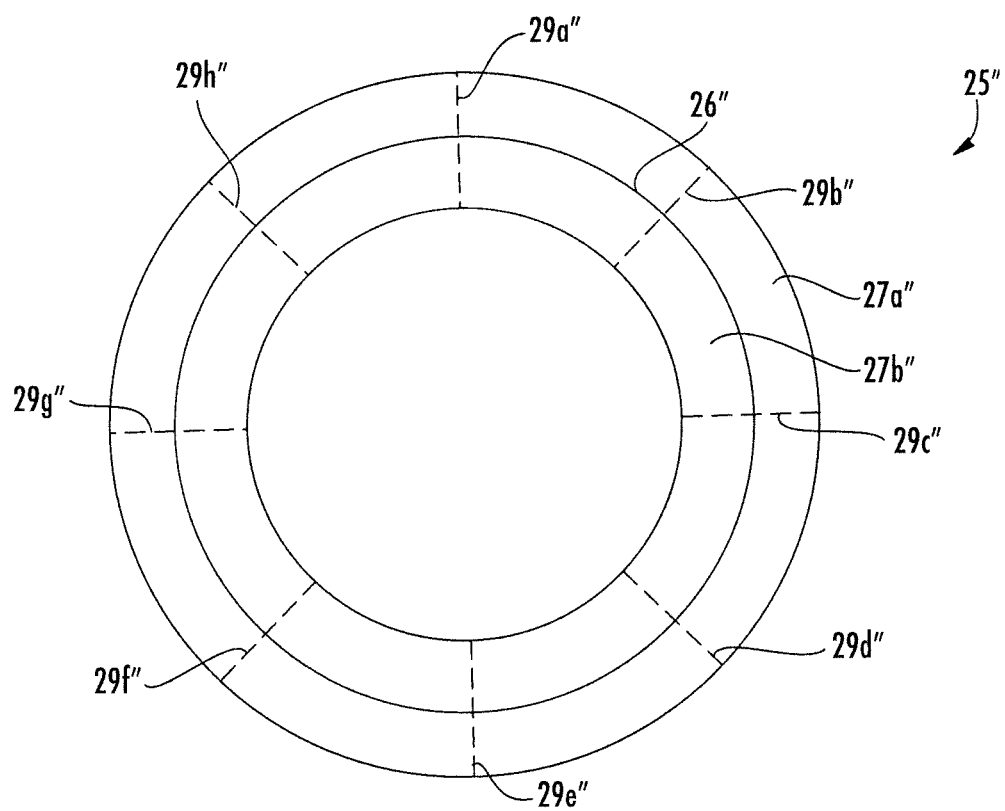
FIG. 5 is a schematic top plan view of another embodiment of the annular spacer from the underground pipe repair device, according to an example embodiment.

Referring now additionally to FIG. 5, another embodiment of the annular spacer 25" is now described. In this embodiment of the annular spacer 25", those elements already discussed above with respect to FIGS. 1-2 are given double prime notation and most require no further discussion herein. This embodiment differs from the previous embodiment in that this annular spacer 25" illustratively includes a plurality of radial gaps $29a''$-$29h''$. The plurality of radial gaps $29a''$-$29h''$ permits the annular spacer 25" to flex and fit a branch pipe opening. In the illustrated embodiment, the plurality of radial gaps $29a''$-$29h''$ is spaced at approximately 45 degrees, but other arrangements are possible, for example, spacing being >10 degrees, and <90 degrees.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An underground pipe repair device for a joint between a service pipe and a branch pipe, the underground pipe repair device comprising:
   a first T-shaped joint liner having a base portion extending laterally in the service pipe, and an arm portion extending vertically into the branch pipe; and
   an annular spacer aligned with and being radially spaced from an opening for the branch pipe and defining an annular gap between said annular spacer and the opening for the branch pipe;
   said annular spacer being coupled to said first T-shaped joint liner for enabling reinstatement of the branch pipe opening without damaging a liner in the service pipe or said first T-shaped joint liner.

2. The underground pipe repair device of claim 1 wherein said annular spacer extends vertically into the service pipe to provide a radial bump about the opening of the branch pipe.

3. The underground pipe repair device of claim 1 wherein said annular spacer defines a plurality of radial gaps.

4. The underground pipe repair device of claim 1 wherein said annular spacer comprises portions, each portion having a different color.

5. The underground pipe repair device of claim 1 wherein said annular spacer comprises a plastic material.

6. The underground pipe repair device of claim 1 wherein said annular spacer comprises a frangible material.

7. The underground pipe repair device of claim 1 wherein said annular spacer has rectangle-shaped cross section.

8. The underground pipe repair device of claim 1 wherein said annular spacer is ellipse-shaped.

9. The underground pipe repair device of claim 1 wherein said annular spacer is circle-shaped.

10. An underground pipe repair system for a joint between a service pipe and a branch pipe, the underground pipe repair system comprising:
    an underground pipe repair device comprising
        a first T-shaped joint liner having a base portion extending laterally in the service pipe, and an arm portion extending vertically into the branch pipe, and
        an annular spacer aligned with and being radially spaced from an opening for the branch pipe and defining an annular gap between said annular spacer and the opening for the branch pipe;
        said annular spacer being coupled to said first T-shaped joint liner for enabling reinstatement of the branch pipe opening without damaging a liner in the service pipe or said first T-shaped joint liner, said annular spacer extending vertically into the service pipe to provide a radial bump about the opening of the branch pipe; and a robot device comprising a transceiver, a cutting tool, and a processor coupled to said transceiver and said cutting tool and configured to move through the service pipe and determine a position of the radial bump, and operate said cutting tool to cut an opening in the liner of the service pipe aligned with said annular spacer so that a portion the liner of the service pipe adjacent the opening of the branch pipe is removed.

11. The underground pipe repair system of claim 10 wherein said annular spacer defines a plurality of radial gaps.

12. The underground pipe repair system of claim 10 wherein said annular spacer comprises portions, each portion having a different color.

13. The underground pipe repair system of claim 10 wherein said annular spacer comprises a plastic material.

14. The underground pipe repair system of claim 10 wherein said annular spacer comprises a frangible material.

15. The underground pipe repair system of claim 10 wherein said annular spacer has rectangle-shaped cross section.

16. A method for operating an underground pipe repair system for repairing a joint between a service pipe and a branch pipe, the method comprising:

positioning an underground pipe repair device at the joint, the underground pipe repair device comprising a first T-shaped joint liner having a base portion extending laterally in the service pipe, and an arm portion extending vertically into the branch pipe, and an annular spacer aligned with and being radially spaced from an opening for the branch pipe and defining an annular gap between the annular spacer and the opening for the branch pipe;

the annular spacer being coupled to the first T-shaped joint liner for enabling reinstatement of the branch pipe opening without damaging a liner in the service pipe or the first T-shaped joint liner;

curing the underground pipe repair device to the joint;

applying and curing a liner for the service pipe; and cutting an opening in the liner of the service pipe aligned with the annular spacer so that a portion the liner of the service pipe adjacent the opening of the branch pipe is removed.

17. The method of claim 16 wherein the annular spacer defines a plurality of radial gaps.

18. The method of claim 16 wherein the annular spacer comprises portions, each portion having a different color.

19. The method of claim 16 wherein the annular spacer comprises a plastic material.

20. The method of claim 16 wherein the annular spacer comprises a frangible material.

\* \* \* \* \*